Nov. 27, 1934.  E. W. DAVIS  1,981,905
LUBRICATING APPARATUS
Filed Feb. 20, 1933
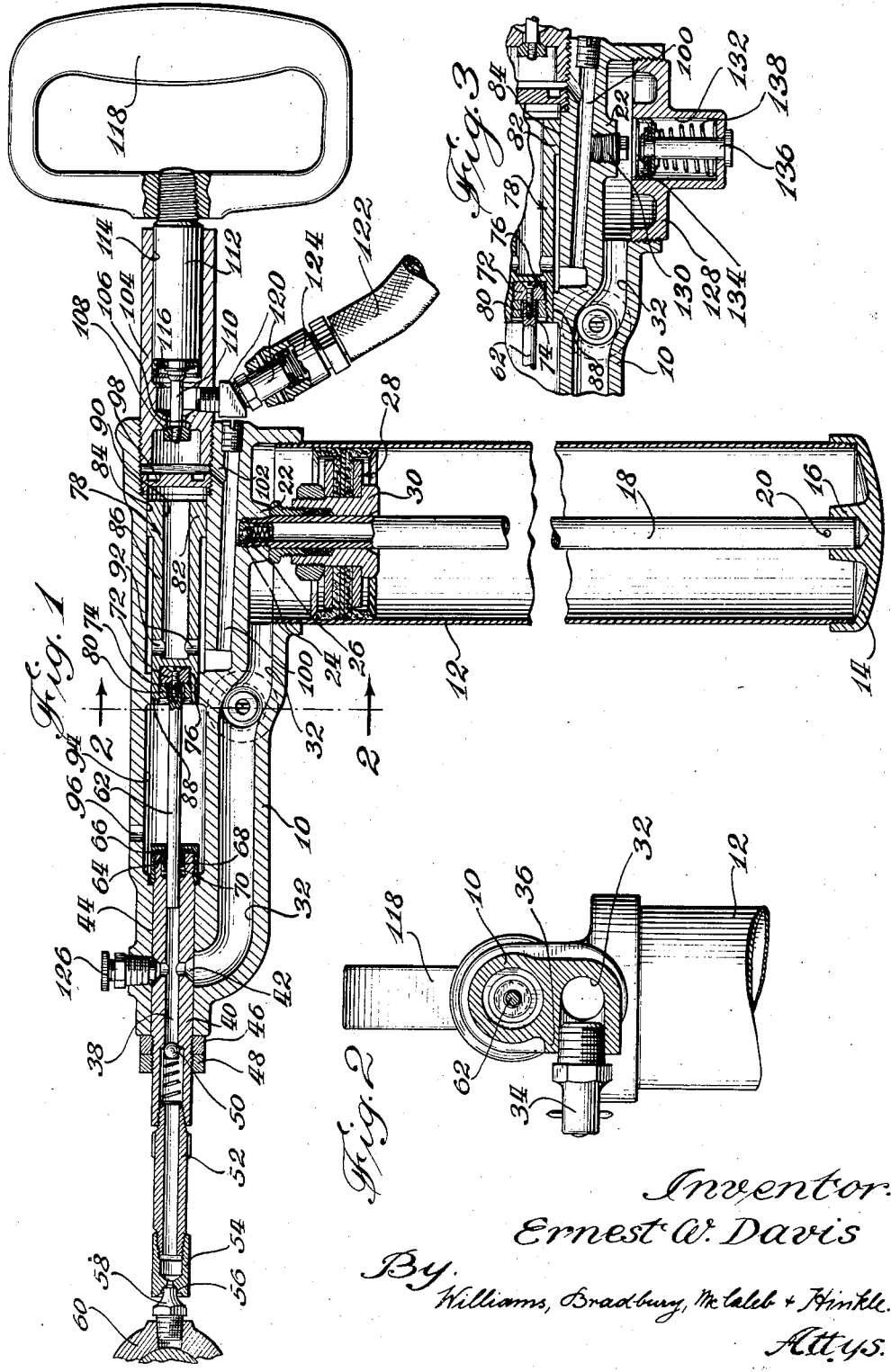
Inventor:
Ernest W. Davis
By
Williams, Bradbury, McCaleb + Hinkle.
Attys.

Patented Nov. 27, 1934

1,981,905

UNITED STATES PATENT OFFICE 1,981,905

LUBRICATING APPARATUS

Ernest W. Davis, Oak Park, Ill., assignor, by mesne assignments, to Stewart-Warner Corporation, Chicago, Ill., a corporation of Virginia Application February 20, 1933, Serial No. 657,497

5 Claims. (Cl. 221—47.4)

My invention relates generally to lubricating apparatus, and more particularly to improvements in pneumatically operated boosters for high pressure lubricating systems in which the coupling connection with the lubricant receiving fitting is made by pressure contact, as distinguished from a detachable mechanical interlocking connection.

In using high pressures for the lubrication of machinery equipped with push type fittings of the general construction illustrated in the patent to Oscar U. Zerk, No. 1,475,980, difficulty is encountered by the operator in determining with what force it is necessary to press the nozzle against the fitting. If the bearing does not offer any appreciable resistance, it is necessary to press the nozzle against the fitting with only slight force, whereas when a bearing of high resistance is encountered, it is necessary for the operator to press the nozzle against the fitting very tightly in order to overcome the back pressure of the lubricant and maintain the nozzle in sealing contact with the fitting. The operator does not, however, have any way of determining whether a bearing about to be lubricated will offer a high resistance to the entrance of lubricant, or will permit the lubricant to flow freely into it.

To be assured that the nozzle will form an effective seal against the fitting under either condition above stated, the operator would have to apply the nozzle to the fitting and forcefully maintain it in position with the expenditure of a great deal of muscular energy. The operation of lubricating a machine is thereby rendered much more difficult and tiring to the operator than necessary, since in the lubrication of a large majority of the bearings of a machine the lubricant will flow into the bearing quite readily and it is not necessary to apply the nozzle to the fitting with a great deal of force. If the operator assumes that all of the bearings to be lubricated are of low resistance, and therefore applies the nozzle to the fittings with a relatively slight pressure, the lubricant will leak from the point of connection of the nozzle and fitting whenever a bearing of high resistance is encountered. The result is a wastage of lubricant and soiling of the machine and greasing pit or floor.

The above mentioned difficulties are encountered to a greater extent when utilizing a compressor of the type disclosed herein in which that portion of the discharge stroke of the plunger which takes place while the plunger is in its cylinder, is effected by the momentum of the plunger and its connected parts. The force of momentum is effective to hold the nozzle against the fitting during the lubricant discharging stroke of the plunger, but upon the return stroke the force of the momentum of the plunger acts in the opposite direction and tends to pull the nozzle away from the fitting. The latter force is substantially proportional to the air pressure acting upon the air piston connected to the plunger.

In the compressor of my invention, means are provided automatically to cause the operator to push the nozzle against the lubricant receiving fitting with a force proportional to the air pressure, and thus assure the maintenance of a sealed connection. The booster is so arranged that when a bearing of high resistance is encountered, the operator will have to press the booster against the fitting with a sufficiently high pressure to maintain the seal, in order to maintain the gun in operation. If he does not press the booster against the fitting with sufficient force to maintain the seal, the supply of air under pressure to the booster pump will be cut off.

It is thus the object of my invention to provide an improved lubricant compressor having means for making it necessary that the operator hold the compressor nozzle against a fitting with sufficient force to prevent leakage between the nozzle and fitting.

A further object is to provide a pneumatically operated lubricant compressor having means for interrupting the supply of compressed air to the motor of the gun whenever the nozzle of the gun is not held against the lubricant receiving fitting with sufficient force to maintain a lubricant-tight seal therewith.

A further object is to provide an improved lubricant compressor having a motor and a handle for forcing the compressor nozzle against a lubricant receiving fitting, the handle being connected to the compressor in such manner that the forces acting between the compressor and its handle are transmitted through an air cushion.

A further object is to provide an improved pneumatically operated lubricant compressor in which the force necessary to be applied to hold the nozzle of the compressor in sealing contact with the lubricant receiving fitting is proportionate to the pressure of the compressed air supply.

A further object is to provide an improved lubricant compressor which may readily be converted into a booster.

A further object is to provide an improved booster having means for aiding in priming the high pressure cylinder.

A further object is to provide an improved lubricant compressor which is simple in construction, may be easily operated, and which may be economically manufactured.

Other objects will appear from the following description, reference being had to the accompanying drawing, in which Fig. 1 is a central vertical sectional view of the grease gun shown as applied to a bearing;

Fig. 2 is a vertical sectional view thereof taken on the line 2—2 of Fig. 1, and Fig. 3 is a fragmentary section showing the changes necessary to convert a lubricant compressor of the type having a lubricant reservoir to one of the booster type.

The lubricant compressor comprises a body 10 having a grease reservoir barrel 12 threaded thereto. The barrel 12 is preferably provided with a cap 14 having a socket 16 formed on its inner surface to receive a tube 18. The lower end of the tube is provided with one or more apertures 20, while the upper end is threaded into a boss 22 formed on the body 10. A check valve cage 24 is threaded into the upper end of the tube 18 and is provided with a spring pressed ball check valve 26.

A piston 28 is freely slidable in the barrel 12 upon the tube 18, and comprises a pair of oppositely facing cup leathers and reinforcing plates rigidly secured to a sleeve 30. The sleeve is provided with a suitable packing box packing and packing nut, to prevent leakage between it and the tube 18. Grease, or other lubricant, may be forced into the upper end of the barrel 12 through a passageway 32 formed in the body 10, by connecting a suitable source of lubricant under pressure to a pin fitting 34 which is threaded in a boss 36 formed on the body 10, and communicates with the grease passageway 32.

The lubricant in the barrel 12 is maintained under pressure, as will appear hereinafter, and forced through a passageway 32 into the bore 38 of a high pressure cylinder 40 through an inlet port 42 formed therein. The cylinder 40 is secured in a bore 44 formed in the end of the body 10 by a nut 46 and lock nut 48. The end of the bore 38 is closed by a spring pressed discharge check valve 50. The end of the cylinder 40 is internally threaded to receive a nozzle extension 52, to the outer end of which a nozzle 54 is secured. The nozzle has a contact face 56 adapted to make a sealing contact with a lubricant receiving fitting 58 threaded in a bearing 60. A hose and suitable coupler may, of course, be substituted for the nozzle whenever desired.

A high pressure plunger 62 is reciprocable in the bore 38 of the cylinder 40, a seal to prevent leakage of lubricant past the plunger being formed by a hat washer 64 retained at the rearward end of the cylinder 40 by a cap nut 66. The hat washer is preferably made of flexible material, such as leather, and is pressed into engagement with the plunger 62 by a conical washer 68 held against the sealing washer 64 by a compression coil spring 70.

The rearward end of the plunger 62 has a head 72 secured thereto by a screw 74, the head being illustrated as being rigidly held in a socket 76 formed in the end of an air motor piston 78 by a threaded ring 80. In many instances it will be desirable to provide a lost motion connection between the plunger 62 and the piston 78. The air motor piston 78 has a portion 82 of enlarged diameter which has a sliding fit in a bore 84 formed in the body 10, and a portion 86 of lesser diameter, which is slidable in a bore 88. The piston 78 has a central bore 90 which is open at its rearward end, and at its forward end is provided with a pair of ducts 92. The piston 78 is adapted to be moved under air pressure from the position in which it is shown in Fig. 1 to a position in which the greater part of the portion 86 of smaller diameter is projected into a chamber 94, which is in communication with the atmosphere through a port 96. The rearward end of the bore 84 is closed by a threaded plug 98, and air under pressure is supplied to the bore 84 at its forward end through an air passageway 100. The air passageway 100 communicates with the bore 84 at a point beyond the plug 98 through a duct 102.

A handle supporting element 104 is threaded in the threaded end of the bore 84 and is provided with a shoulder 106 forming a seat for a valve 108. The valve 108 is rigidly secured to a valve stem 110, which is formed integrally with or rigidly secured to a handle plunger 112, which is freely slidable in a bore 114 formed in the handle supporting element 104. A cup leather 116 is provided to prevent leakage around the handle plunger 112. A handle 118 is threaded to the end of the plunger 112. Air under pressure is supplied to the space between the valve seat 106 and the end of the plunger 112 through a fitting 120 threaded in the handle supporting member 104. The fitting may be of any suitable construction and is illustrated as an angle pin fitting of well known construction. The ball check valve is, however, preferably omitted from the fitting. An air hose 122, connected to a suitable source of compressed air, is connected to the fitting 120 by a coupler 124 of conventional construction.

A manually operable needle valve 126 is threaded in the body 10 and is adapted to permit venting of any air which may be entrapped in the high pressure cylinder.

The grease gun illustrated in Figs. 1 and 2 operates in the following manner: Assuming that the hose 122 is connected to the fitting 120 and supplied with air under suitable pressure, and assuming that the upper portion of the barrel 12 has been filled with lubricant, the operator will grasp the handle 118 and press the nozzle 56 against a lubricant receiving fitting 58 attached to the bearing 60 to be lubricated. The operator will have to press sufficiently hard against the handle 118 to overcome the pressure of the air exerted upon the cup leather 116 of the handle plunger 112, thus to open the valve 108 and permit the air under pressure to flow into the passageway 100. Some of the air thus supplied to the passageway 100 will flow past the check valve 26 through the tube 18 and apertures 20 into the lower end of the barrel 12, and thus exert pressure upon the lower face of the piston 28 and force the latter upwardly to cause sufficient flow of lubricant through the passageway 32 into the bore 38 of the high pressure cylinder to prime the latter. If air is present in the passageway 32, such air may be vented to the atmosphere by opening the air vent valve 126.

As soon as the valve 108 is open, air will flow into the bore 84 and thence through the ports 92 into the bore 90. Air pressure will thus be exerted upon the rear face of the air piston 78 and force the latter to the left (Fig. 1), until the ports 92 are covered by the walls of the bore 88. Thereafter, the air piston will continue backward movement, due to its acquired momentum, until the ports 92 communicate with the air under atmospheric pressure in the chamber 94, whereupon the pressure upon the rear face of the air piston is suddenly reduced. During the latter portion of the forward stroke of the air piston, after the ports 92 are closed by the walls of the bore 88, air pressure exerted in the annular space surrounding the reduced portion 78 of the air piston forms an effective cushion gradually to stop the forward movement of the piston.

Thereafter, the pressure within this annular space and exerted upon the annular shoulder formed by the enlarged portion 82 of the piston forces the air piston to the right, until the ports 92 again communicate with the compressed air, whereupon the air rushes into the right hand end of the bore 86 and forms an air cushion to arrest the return movement of the air piston.

During the forward stroke of the air piston, the plunger 62 is advanced in the bore 38 and forces the lubricant therein past the check valve 50 to the bearing. It will be noted that the end of the plunger 62 passes the inlet port 42 after the ports 92 are in communication with the atmosphere and thus, during the portion of the stroke of the plunger 62 which is effective to discharge lubricant, the plunger derives its power solely from the momentum or inertia of the air piston and parts moving therewith, and that during this movement of the plunger it is being decelerated. As a result, a portion of the inertia forces of the moving parts is transmitted to the nozzle 54 in a direction to hold the nozzle against the fitting. This fact, that the air motor itself provides a force to hold the nozzle against the fitting during the instant that lubricant is being discharged to the fitting, is very advantageous, since it makes it necessary for the operator to exert only sufficient force upon the handle to maintain the nozzle in contact with the fitting, and the additional force necessary to overcome the back pressure of the lubricant is provided by the inertia of the air piston.

As the air piston approaches the end of its return stroke, its momentum, of course, exerts a force tending to move the nozzle away from the fitting and thus reacts against the manual force applied by the operator to hold the nozzle against the fitting. When the pressure of the compressed air supply is high, the air motor will operate more rapidly and with greater power, and it will be necessary manually to apply a greater force to the handle 118 to hold the nozzle against the fitting. It will be noted, however, that when the pressure of the air supply is high, a greater force will be required to open the valve 108 and thus the operator will automatically be required to exert a greater force upon the handle when the pressure of the air supply is high. When the barrel 12 has been emptied, a fresh supply of lubricant may readily be forced thereinto by connecting a source of lubricant under pressure to the pin fitting 34.

The air control valve 118 has the pronounced advantage that it is automatically closed except when the nozzle is pressed against a fitting. Should the nozzle slip from a fitting, the air valve will automatically be closed and wastage of lubricant prevented.

If it is desired to use the lubricant compressor above described as a booster, this may readily be accomplished by removing the barrel 12 and the tube 18 and substituting therefor threaded plugs 128 and 130, respectively. The plug 128 is preferably provided with a pressure chamber 132, in which a piston 134 is reciprocable, the piston being guided by a stem 136 projecting outwardly from the cap. A relatively strong spring 138 normally forces lubricant from the cylindrical chamber 132.

When using the lubricant compressor as a booster, as modified by the changes illustrated in Fig. 3, the grease supply hose may be coupled directly to the fitting 34 and lubricant will flow directly therefrom through the passageway 32 to the high pressure cylinder. Lubricant will, however, also flow rearwardly into the pressure chamber 132, and force the piston 134 downwardly, compressing the spring 138. Since the plunger 62 reciprocates very rapidly, it is essential that the lubricant flow very rapidly into the high pressure cylinder. The grease in a relatively long grease supply hose might, due to its inertia and due to its friction with the walls of the hose, fail to flow sufficiently rapidly to prime the high pressure cylinder. With the pressure chamber 132, the lubricant in the passageway 23 will at all times be maintained under relatively high pressure by the spring 138 acting upon the piston 134, so that the priming of the high pressure cylinder will take place rapidly.

In other respects, the construction of the booster suggested in Fig. 3 may be similar to that shown in Figs. 1 and 2, and its operation will likewise be similar to the previously described embodiment of my invention.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In lubricating apparatus of the class described, the combination of a high pressure cylinder and plunger, means to supply lubricant to said high pressure cylinder, a reciprocating air motor operably connected with said plunger, a source of air under pressure, a valve located between said source and said air motor, a handle for holding the gun against a fitting to be supplied with lubricant, a piston connected to said handle and exposed to air under pressure, and an operating connection between said valve and said piston.

2. In a lubricant compressor, the combination of a source of lubricant under pressure, a high pressure cylinder, a plunger reciprocable therein, a reciprocatory motor connected to said cylinder and plunger for operation of the latter, a valve for admitting air under pressure to said motor, a handle for supporting said motor and cylinder, said handle having a part exposed to the pressure of air, and rigid means connecting said handle with said valve for manually operating the latter by movement of the handle in a direction opposed to the air pressure on said part.

3. In a device of the class described, the combination of a lubricant compressor having a nozzle adapted to make a sealed connection with a lubricant receiving fitting by pressure contact, a reciprocatory air motor for operating said compressor, said air motor being arranged to have its reciprocatory part operate said plunger upon the effective portion of its discharge stroke by acquired momentum, a valve for admitting air under pressure to said air motor, and means for opening said valve, said means comprising a movable handle for supporting the lubricant compressor and having a piston operatively associated therewith and exposed to the air under pressure supplied to said air motor.

4. In lubricating apparatus of the class described, the combination of a fluid pressure operated lubricant pumping mechanism, a handle movably connected to said mechanism, a source of pressure fluid, a valve for controlling the flow of the pressure fluid to said mechanism, an operative connection between said handle and said valve, and a piston connected to said handle and exposed to the pressure of fluid from said source, said piston being operative to move said handle and close said valve.

5. In a high pressure lubricating apparatus, the combination of a high pressure pumping mechanism, a discharge nozzle connected thereto arranged to make a lubricant-tight seal with a receiving fitting by pressure contact, a handle secured to said mechanism by a lost motion connection, a fluid pressure operated motor for operating said pumping mechanism, fluid pressure operated means to move said handle in a direction away from said nozzle, and a pressure fluid control valve constructed and arranged to be opened by movement of said handle in the direction of said nozzle.

ERNEST W. DAVIS.